No. 608,711. W. H. POWELL. Patented Aug. 9, 1898.
ELECTRIC MOTOR.
(Application filed Nov. 4, 1897.)
(No Model.)
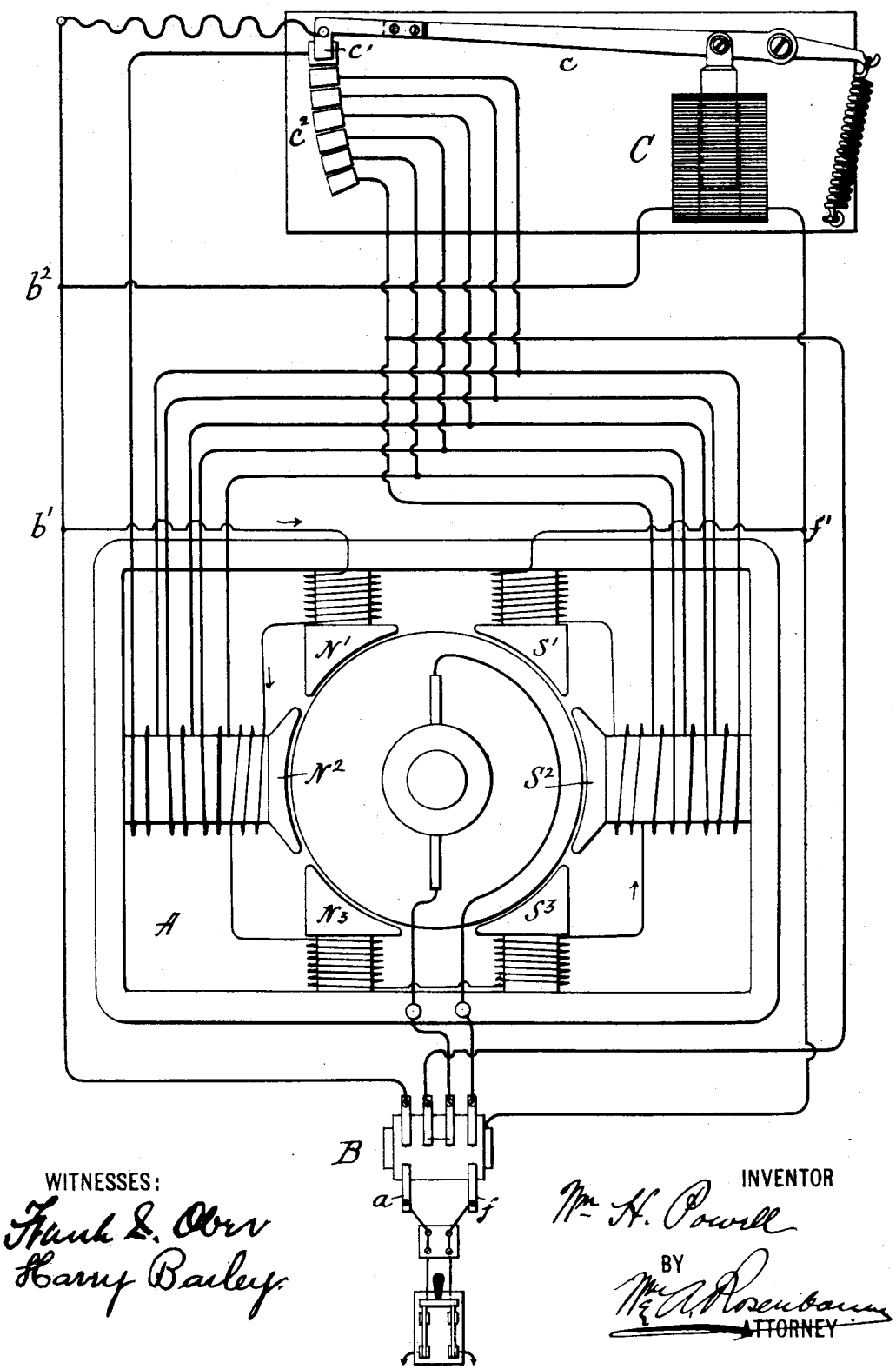
WITNESSES:
Frank S. Ober
Harry Bailey
INVENTOR
W. H. Powell
BY
W. A. Rosenbaum
ATTORNEY

UNITED STATES PATENT OFFICE.

WILLIAM H. POWELL, OF ERIE, PENNSYLVANIA, ASSIGNOR TO THE KEYSTONE ELECTRIC COMPANY, OF PENNSYLVANIA.

ELECTRIC MOTOR.

SPECIFICATION forming part of Letters Patent No. 608,711, dated August 9, 1898.

Application filed November 4, 1897. Serial No. 657,407. (No model.)

*To all whom it may concern:*

Be it known that I, WILLIAM H. POWELL, a citizen of the United States, residing at Erie, in the county of Erie and State of Pennsylvania, have invented certain new and useful Improvements in Electric Motors, of which the following is a full, clear, and exact description.

My invention relates to improvements in electric motors particularly designed for elevators and hoists, also for other machinery where a constant or variable speed is desired.

The object of my invention is to prevent the sudden rush of current through the motor-armature at starting and to secure all the necessary starting torque with a current not greater than the normal working current of the motor; also, to combine all the advantages of a compound and a shunt motor by running as a compound machine at starting, when the compounding is advantageous, and as a shunt-machine after full speed is attained, when a shunt-motor is the most satisfactory if a constant speed is desired. It may also be run as a compound motor, if a variable speed is desired, by cutting in or out a part of the series coils.

The motor is a bipolar compound-wound machine in which the pole-pieces are each divided into three separate projections, the series coils being preferably confined to the middle ones and the shunt-coils to the others, thus affording a constant and strong field adjacent to the line of commutation.

In the accompanying drawing the figure is a diagrammatical representation of the motor and controlling mechanism.

In the drawing, A represents the motor; B, a reversing-switch of any known type; C, an automatic switch consisting of a magnet across the line in shunt with the armature and series coils and also with the shunt-field winding or connected in series with shunt-field winding and an arm $c$, having a trailing finger $c'$, moving over the contacts $c^2$.

The motor preferably has six poles $N'$, $N^2$, and $N^3$ and $S'$, $S^2$, and $S^3$. $N'$, $N^2$, and $N^3$ are of one polarity, and $S'$, $S^2$, and $S^3$ are of the opposite polarity. On the poles $N^2$ and $S^2$ are wound the series coils and also a part of the shunt-coils. The series coils are divided into sections connected, respectively, with the contacts $c^2$ of the automatic switch C. On $N'$, $N^3$, $S'$, and $S^3$ are wound shunt-coils, but no series coils, and the strength of the field of these poles is therefore practically constant. The object of maintaining a constant strength in a portion of the field while the strength as a whole is purposely varied is to effect a sparkless commutation. The strength of field in $N^2$ and $S^2$ is varied by cutting in and out of circuit portions of the series winding. It also depends with a given amount of winding in circuit on the strength of the current. The shunt-coils on $N^2$ and $S^2$ accomplish a twofold object—first, to insure there being sufficient field when the series wire is all cut out, and, second, to prevent the leakage of lines from $N'$ and $N^3$ through $N^2$ and from $S'$ and $S^3$ through $S^2$.

The method of operation is as follows: When the switch B is thrown in, the current enters the switch at $a$ from the positive side of the line and goes to $b'$ where it divides, a small portion going through the shunt-coils of the motor to $f$, which is the negative side of the line, and a small portion branching at $b^2$ and passing through magnet C, joining the shunt-field current again at $f'$ and returning with it to $f$. The larger portion of the current from $b$ goes to finger $c'$ of the switch C, through all the series coils of the motor, to the reversing-switch, thence through the armature in one direction or the other according as the switch B is set for a desired direction of rotation of armature and back to the line through the switch. The current flowing through the series coils and armature at the instant the switch is thrown in is not greater than the full-load current of the motor, because the ohmic resistance of the series winding is sufficient to keep it down to this amount. This current flowing through the series coils produces an intense field and a torque which is sufficient to start the motor if the load is not excessive. Moreover, a considerable counter electromotive force is developed with a moderate speed. The field due to the shunt-coils is also building up very rapidly, being slightly retarded by self-induction. The magnet C increases in strength, gradually cutting out the ohmic resistance and decreasing the ampere-turns and strength of field due to a given current; but the increasing speed of the armature keeps up the counter electromotive force, so that the current will gradually adjust itself to the load as the speed increases and will at no time be greater than the rated full-load current of the motor.

Having thus described my invention, I claim—

1. A compound-wound electric motor having each of its poles divided into three or more parts, the end parts carrying shunt-windings and the middle parts the series windings, for the purpose set forth.

2. A compound-wound electric motor having each of its poles divided into three or more parts, the end parts carrying shunt-winding and the middle parts carrying the series winding, and also shunt-winding, for the purpose set forth.

3. A compound-wound electric motor having each of its poles divided into three or more parts, the end parts carrying shunt-winding and the middle parts carrying the series coils which are wound in sections, in combination with means for varying the number of series sections in circuit with armature, for the purpose set forth.

4. A compound-wound electric motor having each of its poles divided into three or more parts, the end parts carrying shunt-winding and the middle parts carrying shunt-winding and also the series coils, which are wound in sections, in combination with means for varying the number of series sections in circuit with armature, for the purpose set forth.

In testimony whereof I subscribe my signature in presence of two witnesses.

WILLIAM H. POWELL.

Witnesses:
   J. W. LEECH,
   F. B. DOWNING.